(12) United States Patent
Ishida

(10) Patent No.: US 8,711,464 B2
(45) Date of Patent: Apr. 29, 2014

(54) PROTECTION CIRCUIT, SUBSTRATE FOR ELECTRO-OPTICAL DEVICE, ELECTRO-OPTICAL DEVICE, ELECTROPHORETIC DISPLAY DEVICE, ELECTRONIC APPARATUS, AND MANUFACTURING METHOD OF ELECTRO-OPTICAL DEVICE

(75) Inventor: Yukimasa Ishida, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 282 days.

(21) Appl. No.: 12/961,735

(22) Filed: Dec. 7, 2010

(65) Prior Publication Data

US 2011/0141550 A1    Jun. 16, 2011

(30) Foreign Application Priority Data

Dec. 10, 2009  (JP) .................. 2009-280634

(51) Int. Cl.
*G02F 1/03* (2006.01)
*G02B 26/00* (2006.01)
*H02H 9/00* (2006.01)

(52) U.S. Cl.
USPC .............. 359/254; 359/296; 361/56

(58) Field of Classification Search
USPC ............ 359/245, 254, 296; 361/54, 56
See application file for complete search history.

(56) References Cited

U.S. PATENT DOCUMENTS

| 7,751,163 B2 * | 7/2010 | Duch et al. ............ 361/56 |
| 2002/0021375 A1 | 2/2002 | Nakajima et al. |
| 2003/0112402 A1 | 6/2003 | Nakajima et al. |
| 2003/0117537 A1 | 6/2003 | Nakajima et al. |
| 2005/0230757 A1 | 10/2005 | Nagasawa et al. |
| 2008/0143640 A1 | 6/2008 | Hsu et al. |

FOREIGN PATENT DOCUMENTS

| JP | 03-249624 A | 11/1991 |
| JP | 2003-263120 A | 9/2003 |
| JP | 2005-309003 A | 11/2005 |
| JP | 2008-152225 A | 7/2008 |

* cited by examiner

*Primary Examiner* — William Choi
(74) *Attorney, Agent, or Firm* — ALG Intellectual Property, LLC

(57) ABSTRACT

A protection circuit includes: a first electrode; a second electrode; and an ionic material which comes into contact with the first electrode and the second electrode, wherein when a given difference in potential is generated between the first electrode and the second electrode, an electric current flows between the first electrode and the second electrode through the ionic material.

9 Claims, 10 Drawing Sheets

PROTECTION CIRCUIT, SUBSTRATE FOR ELECTRO-OPTICAL DEVICE, ELECTRO-OPTICAL DEVICE, ELECTROPHORETIC DISPLAY DEVICE, ELECTRONIC APPARATUS, AND MANUFACTURING METHOD OF ELECTRO-OPTICAL DEVICE

BACKGROUND

1. Technical Field

The present invention relates to a protection circuit, a substrate for an electro-optical device, an electro-optical device, an electrophoretic display device, an electronic apparatus, and a method of manufacturing an electro-optical device.

2. Related Art

When manufacturing an electrophoretic display device of an active matrix driving system using an electronic ink sheet (hereinafter referred to as an "EP sheet"), there is a plurality of processes such as a process for bonding the EP sheet to an active matrix substrate, a process for mounting a terminal portion, a seal sealing process, a scribe breaking process, and a laminating process, and there is a need to protect an electrical function of the electrophoretic device from static electricity which is generated in these processes, so that various protection circuits and protection methods have been known heretofore.

In JP-A-2008-152225, although it is a technique well known in regard to a liquid crystal display device, electrostatic protection is shown which is performed by connecting scanning lines and signal lines to a common electrode line through short rings using a transistor or a diode.

Also, in JP-A-2005-309003, a preferred arrangement of an electrostatic protection diode circuit is shown, and enlargement of a space required for arrangement of the electrostatic protection diode circuit on a substrate is prevented.

Here, naturally, an electrostatic protection circuit must be designed as an element having the capability sufficient to allow static electricity, which is generated in each manufacturing process, to escape. However, if it is an element which is switched at a low bias voltage, this results in an increase in consumption of electric current at the time of the actual driving of an electrophoretic display device, thereby being undesirable.

Also, an element which is destroyed by performing switching with static electricity bias and short-circuited without being opened is also undesirable.

Also, from a manufacturing viewpoint or from layout restrictions on a substrate, it is preferable that an electrostatic protection circuit be as simple as possible.

In the known techniques such as the above-described documents and the like, solutions which address such problems have not been made.

SUMMARY

An advantage of some aspects of the invention is that a protection circuit is obtained which has a simple configuration and does not generate defects in a circuit configuration even in a case where it is destroyed by excessive voltage, and also that a substrate for an electro-optical device, an electro-optical device, an electrophoretic display device, and an electronic apparatus are obtained in which it is possible to reliably protect an internal circuit from surge voltage caused by static electricity or the like and which have excellent reliability, by using the protection circuit. Also, another advantage of some aspects of the invention is that it provides a manufacturing method of an electro-optical device, by which the device can be easily manufactured and which has high yield.

According to a first aspect of the invention, there is provided a protection circuit including: a first electrode; a second electrode; and an ionic material which comes into contact with the first electrode and the second electrode, wherein when a given difference in potential is generated between the first electrode and the second electrode, an electric current flows between the first electrode and the second electrode through the ionic material.

According to the protection circuit of the above aspect of the invention, if surge voltage caused by static electricity or the like is input, a given difference in potential is generated between the first electrode and the second electrode and an electric current flows between the first electrode and the second electrode through the ionic material, so that an open state is made. As a result, the protection circuit with a simple configuration is obtained which can excellently bypass the surge voltage.

According to a second aspect of the invention, there is provided a substrate for an electro-optical device, including: a substrate; a pixel circuit arranged and formed on the substrate; a wiring connected to the pixel circuit; and a protection circuit connected to the wiring, wherein the protection circuit includes a first electrode, a second electrode, and an ionic material which comes into contact with the first electrode and the second electrode, and when a given difference in potential is generated between the first electrode and the second electrode, an electric current flows between the first electrode and the second electrode through the ionic material.

According to the substrate for an electro-optical device of the above aspect of the invention, if surge voltage caused by static electricity or the like is input to the wiring, a given difference in potential is generated between the first electrode and the second electrode of the protection circuit and an electric current flows between the first electrode and the second electrode through the ionic material, thereby allowing electric discharge to occur. In this manner, by providing the protection circuit which does not generate defects in a circuit configuration even in a case where it is destroyed by excessive voltage, it is possible to reliably protect the pixel circuit from surge voltage with a simple configuration.

According to a third aspect of the invention, there is provided an electro-optical device having an electro-optical material layer formed on a substrate, the device including: a pixel circuit arranged and formed on the substrate; a wiring connected to the pixel circuit; and a protection circuit connected to the wiring, wherein the protection circuit includes a first electrode, a second electrode, and an ionic material which comes into contact with the first electrode and the second electrode, at least one of the first electrode and the second electrode is connected to the wiring, and when a given difference in potential is generated between the first electrode and the second electrode, an electric current flows between the first electrode and the second electrode through the ionic material.

According to the electro-optical device of the above aspect of the invention, due to the protection circuit which does not generate defects in a circuit configuration even in a case where it is destroyed by excessive voltage, it is possible to reliably protect the pixel circuit from surge voltage caused by static electricity or the like with a simple configuration, so that the electro-optical device having excellent reliability is obtained.

Also, it is preferable that the first electrode or the second electrode contain the same component as that of a pixel electrode which is included in the pixel circuit.

According to this embodiment of the invention, since the electro-optical device has a configuration in which the first electrode or the second electrode of the protection circuit contains the same component as that of a pixel electrode which is included in the pixel circuit, the first electrode or the second electrode can be formed by using the same material as that of the pixel electrode in the same manufacturing process when forming the pixel electrodes, so that manufacturing is easy, whereby an increase in cost can be prevented.

According to a fourth aspect of the invention, there is provided an electrophoretic display device having an electrophoretic element sandwiched in between a pair of substrates, the device including: on one side of the substrate, a plurality of pixel circuits, a wiring connected to the respective pixel circuits, and a protection circuit connected to the wiring, wherein the protection circuit includes a first electrode, a second electrode, and an ionic material which comes into contact with the first electrode and the second electrode, and when a given difference in potential is generated between the first electrode and the second electrode, an electric current flows between the first electrode and the second electrode through the ionic material.

According to the electrophoretic display device of the above aspect of the invention, due to the protection circuit which does not generate defects in a circuit configuration even in a case where it is destroyed by excessive voltage, it is possible to reliably protect the pixel circuit from surge voltage caused by static electricity or the like with a simple configuration, so that the electrophoretic display device having excellent reliability is obtained.

Also, it is preferable that the electrophoretic element includes a plurality of microcapsules containing electrophoretic particles, and a binder fixing the microcapsules, and that the ionic material of the protection circuit contains the same component as that of the binder.

According to this embodiment of the invention, since the ionic material is composed of a material containing the same component as that of the binder of the electrophoretic element, there is no need to prepare another new material for the ionic material, so that an increase in cost can be prevented.

Also, it is preferable that the electrophoretic element and the substrate be bonded to each other through an adhesive layer and that the ionic material of the protection circuit contains the same component as that of the adhesive layer.

According to this embodiment of the invention, since the ionic material of the protection circuit is composed of a material containing the same component as that of the adhesive layer which bonds the electrophoretic element to the substrate, there is no need to prepare another new material for the ionic material, so that an increase in cost can be prevented.

Also, it is preferable that the electrophoretic element be disposed on the protection circuit.

According to this embodiment of the invention, since the electrophoretic element is disposed on the protection circuit, it is possible to make a portion of the adhesive layer, which bonds the electrophoretic element to the substrate, function as the ionic material of the protection circuit. As a result, since it is possible to dispose the adhesive layer as the ionic material on a pair of electrodes of the protection circuit simultaneously with disposition of the electrophoretic element, manufacturing becomes easier, so that working hours are shortened.

Also, it is preferable that the first electrode or the second electrode contains the same component as that of the pixel electrode which is included in the pixel circuit.

According to this embodiment of the invention, since the first electrode or the second electrode can be formed by using the same material as the pixel electrode in the same manufacturing process when forming the pixel electrode, manufacturing is easy, so that an increase in cost can be prevented.

According to a fifth aspect of the invention, there is provided an electronic apparatus provided with the electro-optical device according to the third aspect of the invention.

According to the electronic apparatus of the above aspect of the invention, since the electronic apparatus is provided with the electro-optical device in which it is possible to excellently protect the pixel circuit from surge voltage caused by static electricity or the like, the electronic apparatus having excellent reliability is obtained.

According to a sixth aspect of the invention, there is provided a method of manufacturing an electro-optical device including an electro-optical material layer formed on a substrate, the method including: forming a pixel circuit, a wiring connected to the pixel circuit, and a protection circuit connected to the wiring, on the substrate; and increasing insulation properties of the protection circuit; wherein the protection circuit includes a first electrode, a second electrode, and an ionic material which comes into contact with the first electrode and the second electrode, and the step of increasing insulation properties of the protection circuit is a step of generating a given difference in potential between the first electrode and the second electrode, thereby making electrical corrosion occur in the first electrode or the second electrode.

According to the method of manufacturing an electro-optical device of the above aspect of the invention, by generating a given difference in potential between the first electrode and the second electrode, which constitute the protection circuit, thereby making electrical corrosion occur in the first electrode or the second electrode, the gap between these electrodes is widened or the like, so that it becomes hard for an electric field to be applied between the electrodes, whereby insulation properties of the protection circuit are increased. As a result, there is electric conduction only in a case where surge voltage has occurred, so that it is possible to secure insulation properties at the time of normal driving while reliably protecting the pixel circuit.

Also, it is preferable that the first electrode and the second electrode be composed of different types of electrically conductive materials.

According to this embodiment of the invention, since the first electrode and the second electrode are composed of different types of electrically conductive materials, their electrochemical potentials are different from each other, so that electric cell action can be reliably obtained. As a result, open destruction of the protection circuit is facilitated.

Also, it is preferable that the first electrode or the second electrode be composed of an electrically conductive material containing metal oxide as its main component.

According to this embodiment of the invention, since the first electrode or the second electrode is composed of an electrically conductive material containing metal oxide as its main component, insulation properties of the protection circuit can be further increased.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of a substrate for an electro-optical device, an electro-optical device, and an electronic apparatus according to the invention will be described using the drawings.

In addition, the scope of the invention is not to be limited to the following embodiments, but can be arbitrarily changed within the scope of the technical idea of the invention. Also, in the following drawings, to facilitate understanding of each configuration, the scale of reduction, the number, or the like in each structure is sometimes shown differently from that of an actual structure.

Active Matrix Substrate

Figure 1:
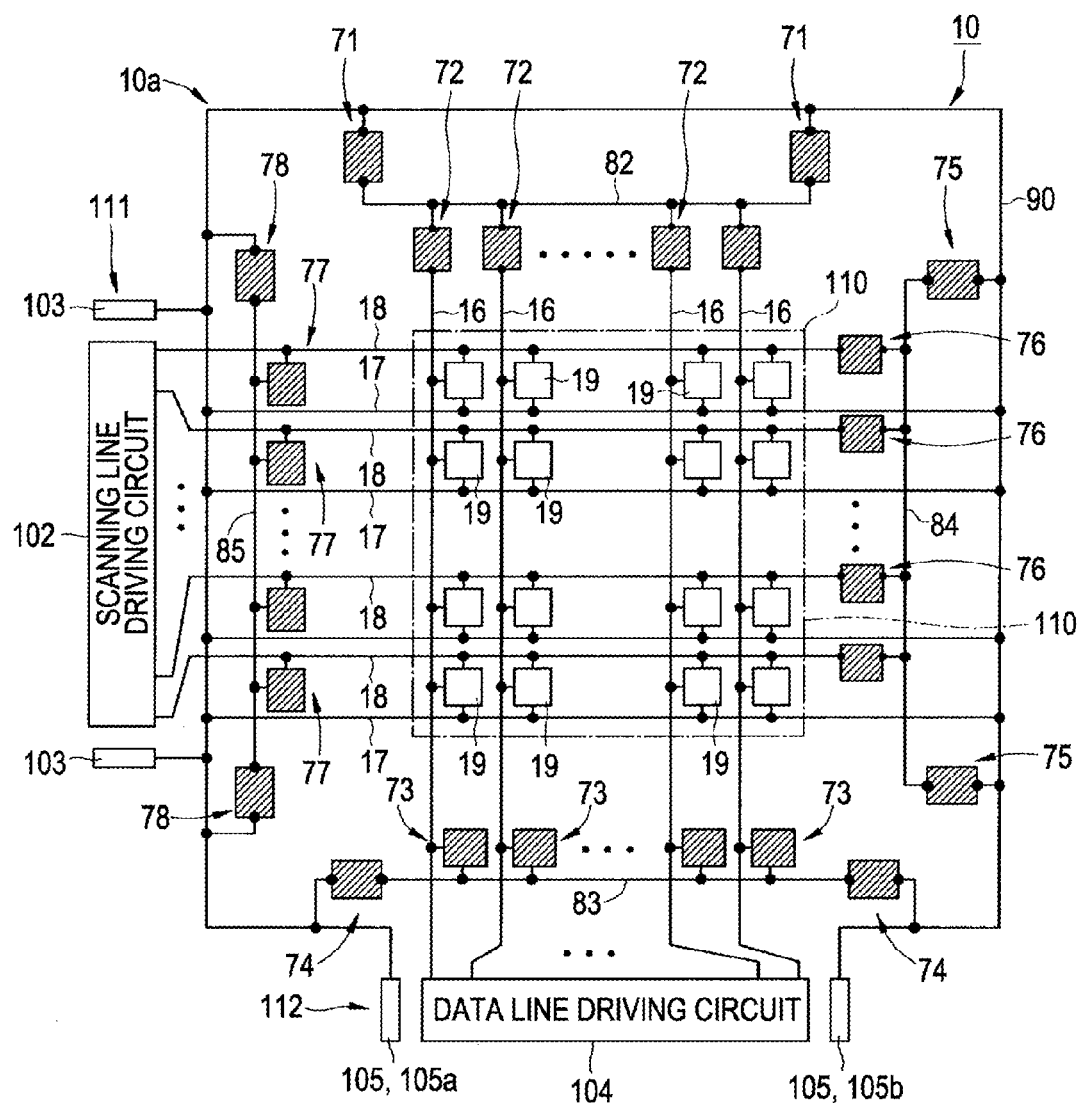
FIG. 1 is a circuit diagram showing an electrical configuration of an active matrix substrate related to an embodiment.
Figure 2A:
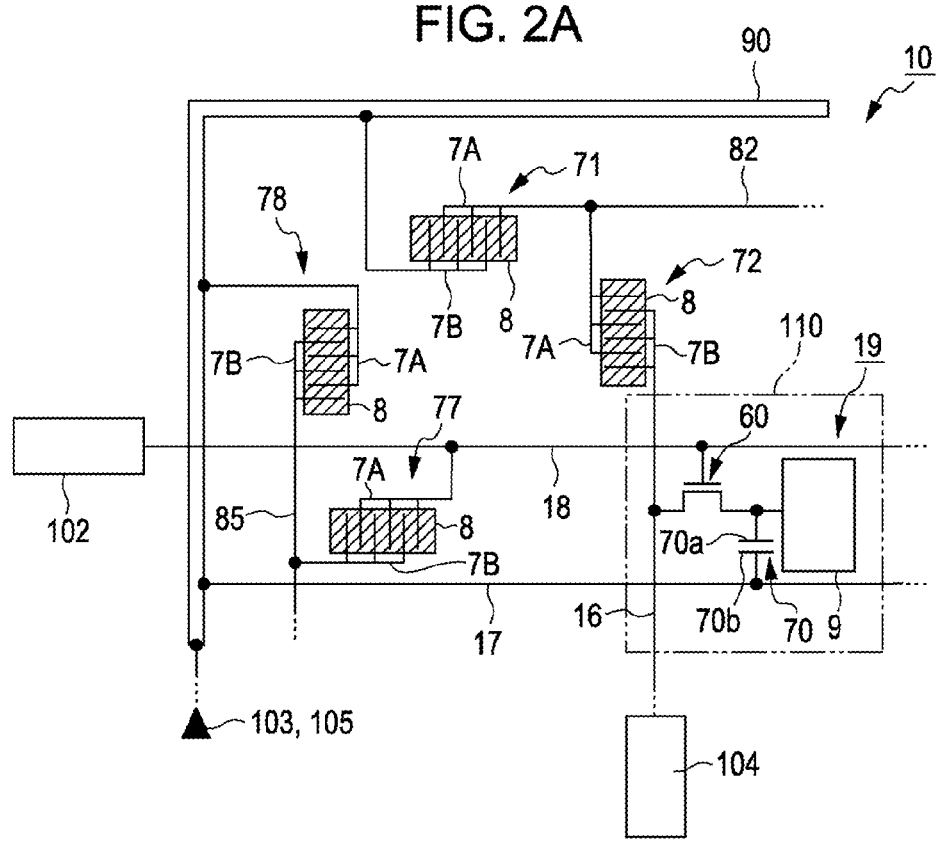
FIGS. 2A and 2B are circuit diagrams showing partial regions of FIG. 1 in more detail.
Figure 2B:
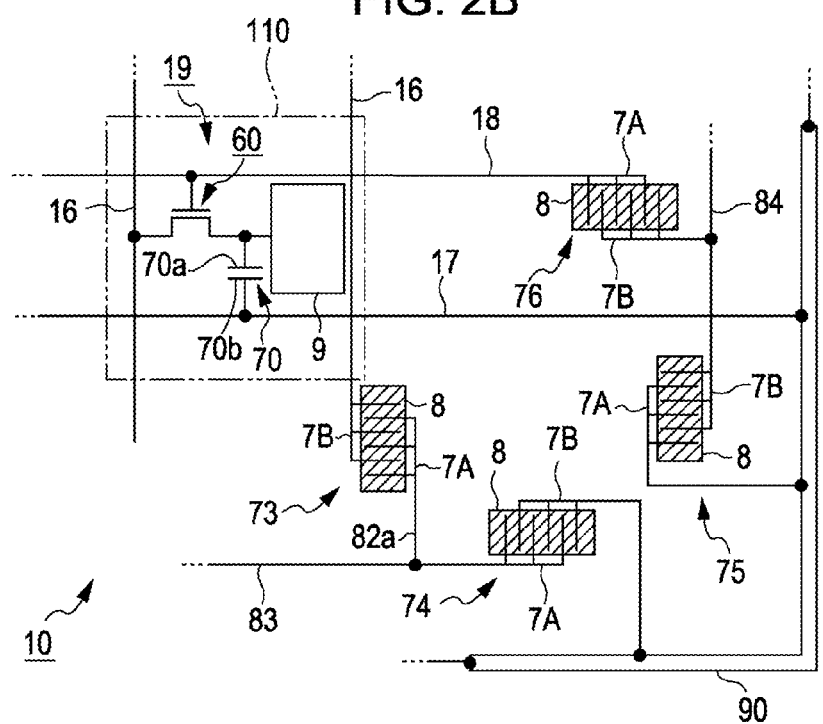

FIG. 1 is a circuit diagram showing an electrical configuration of an active matrix substrate 10 as a substrate for an electro-optical device according to the invention. FIGS. 2A and 2B are circuit diagrams showing partial regions of FIG. 1 in more detail.

The active matrix substrate 10 includes a pixel formation region 110 where a plurality of pixels 19 is arranged vertically and horizontally, a shield wiring 90 with an approximately rectangular frame shape which is formed to surround the pixel formation region 110, a first circuit formation region 111 provided along one side of the shield wiring 90, and a second circuit formation region 112 provided along a side adjacent to the side where the first circuit formation region 111 is formed.

Hereinafter, an embodiment of the invention will be described with reference to the drawings. In addition, in each drawing which is used in the following explanation, in order to make each member a recognizable size, the scale of reduction of each member is appropriately changed.

At the pixel formation region 110, a plurality of pixels 19 is arranged in a matrix form in a plan view. In the pixel formation region 110, a plurality of data lines 16, a plurality of capacitor lines 17, and a plurality of scanning lines 18 are formed which extend in directions intersecting each other. The capacitor lines 17 extend in a direction along the scanning lines 18. The pixels 19 are each formed in the vicinity of an intersecting portion of the data line 16 and the scanning line 18, and the respective pixels 19 are connected to the data line 16, the capacitor line 17, and the scanning line 18.

The data line 16 is extended to the outside of the pixel formation region 110, and to an end portion on one side thereof, a data line driving circuit 104 is connected. To an end portion on the other side of the data line 16 extended to a marginal side on the opposite side to the data line driving circuit 104, a protection circuit 72 is connected. The protection circuit 72 is connected to a common wiring 82 and also to the data line 16. The common wiring 82 is connected to the shield wiring 90 through protection circuits 71 connected to both ends thereof.

Also, a protection circuit 73 is connected to the portion of the data line 16, which extends to the data line driving circuit 104 side, and the protection circuit 73 is further connected to a common wiring 83. The common wiring 83 is connected to the shield wiring 90 through protection circuits 74 connected to both ends thereof.

The scanning line 18 is extended to the outside of the pixel formation region 110, and to an end portion on one side thereof, a scanning line driving circuit 102 is connected. To an end portion on the other side of the scanning line 18 extended to a marginal side on the opposite side to the scanning line driving circuit 102, a protection circuit 76 is connected. To the protection circuit 76, a common wiring 84 is connected, and the common wiring 84 is connected to the shield wiring 90 through protection circuits 75 connected to both ends thereof.

Also, a protection circuit 77 is connected to the portion of the scanning line 18, which extends to the scanning line driving circuit 102 side, and the protection circuit 77 is further connected to a common wiring 85. The common wiring 85 is connected to the shield wiring 90 through protection circuits 78 connected to both sides thereof.

The capacitor line 17 is extended in a direction along the scanning line 18 from the pixel formation region 110 and both ends thereof are connected to the shield wiring 90. Also, to the shield wiring 90, external connection terminals 103 and 105 are connected, and potential input through these external connection terminals 103 and 105 is possible.

In the case of this embodiment, the shield wiring 90 is formed into a frame shape which extends from the external connection terminal 105 (105a) on one side, thereby wrapping around the pixel formation region 110, and reaches the external connection terminal 105 (105b) on the other side. In the vicinity of each of the external connection terminals 105, the shield wiring 90 and the common wiring 83 are connected to each other through the protection circuit 74, and a circuit which is formed by the shield wiring 90, two protection circuits 74, and the common wiring 83 is disposed to surround the pixel formation region 110.

Figure 3A:
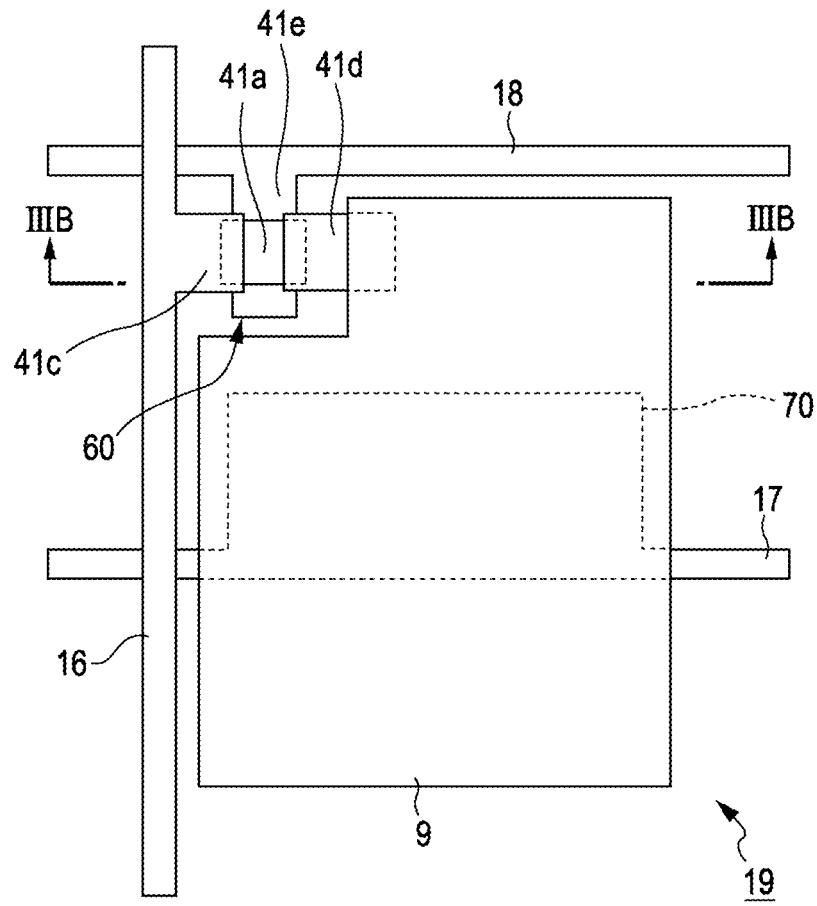
FIGS. 3A and 3B respectively are a plan view and a cross-sectional view of the active matrix substrate in regard to one pixel.
Figure 3B:
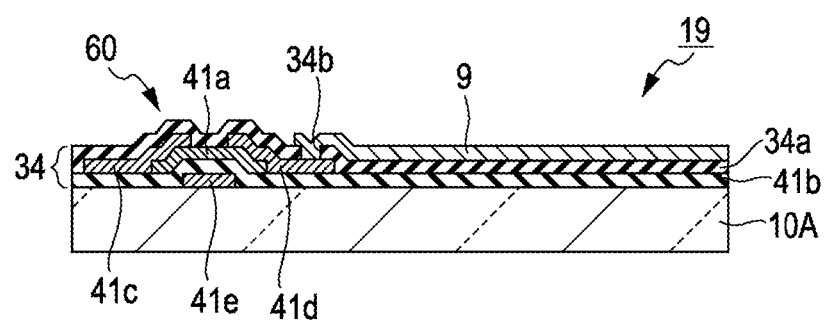

In FIGS. 2A and 2B, circuit diagrams showing partial regions of FIG. 1 in more detail are shown, and a plan view (FIG. 3A) and a cross-sectional view (FIG. 3B) of the active matrix substrate in regard to one pixel are shown in FIGS. 3A and 3B, respectively.

First, a pixel circuit is described.

As shown in FIGS. 2A and 2B, at the pixel 19 formed in the pixel formation region 110, a pixel circuit is provided which is composed of a TFT (thin-film transistor) 60, a pixel electrode 9 connected to a drain of the TFT 60, and a storage capacitor 70 with one electrode (a capacitor electrode 70a) connected between the TFT 60 and the pixel electrode 9. The data line 16, to which an image signal is supplied, is connected to a source of the TFT 60, and the scanning line 18 is connected to a gate of the TFT 60. The other electrode (a capacitor electrode 70*b*) of the storage capacitor 70 is connected to the capacitor line 17.

Here, FIG. 3A is a plan view of a substrate main body 10A in regard to one pixel 19 and FIG. 3B is a cross-sectional view taken at a position along line IIIB-IIIB of FIG. 3A.

As shown in FIG. 3A, the TFT 60 has a semiconductor layer 41*a* with an approximately rectangular shape in a plan view, a source electrode 41*c* extended from the data line 16, a drain electrode 41*d* which connects the semiconductor layer 41*a* and the pixel electrode 9, and a gate electrode 41*e* extended from the scanning line 18. The TFT 60 of this embodiment has an inverted stagger structure in which the gate electrode 41*e* is formed between the semiconductor layer 41*a* and the substrate main body 10A.

Looking at a cross-section structure shown in FIG. 3B, the gate electrode 41*e* (the scanning line 18) composed of Al or an Al alloy is formed on the substrate main body 10A, and a gate insulating film 41*b* composed of silicon oxide or silicon nitride is formed to cover the gate electrode 41*e*. The semiconductor layer 41*a* composed of amorphous silicon or polysilicon is formed at a region facing the gate electrode 41*e* with the gate insulating film 41*b* interposed therebetween. The source electrode 41*c* and the drain electrode 41*d* which are composed of Al or an Al alloy are formed in such a manner that a portion of each of the electrodes is placed on the semiconductor layer 41*a*. An interlayer insulation film 34*a* composed of silicon oxide or silicon nitride is formed to cover the source electrode 41*c* (the data line 16), the drain electrode 41*d*, the semiconductor layer 41*a*, and the gate insulating film 41*b*. The pixel electrode 9 is formed on the interlayer insulation film 34*a*. The pixel electrode 9 and the drain electrode 41*d* are connected to each other through a contact hole 34*b* which passes through the interlayer insulation film 34*a* and reaches the drain electrode 41*d*.

Figure 4A:
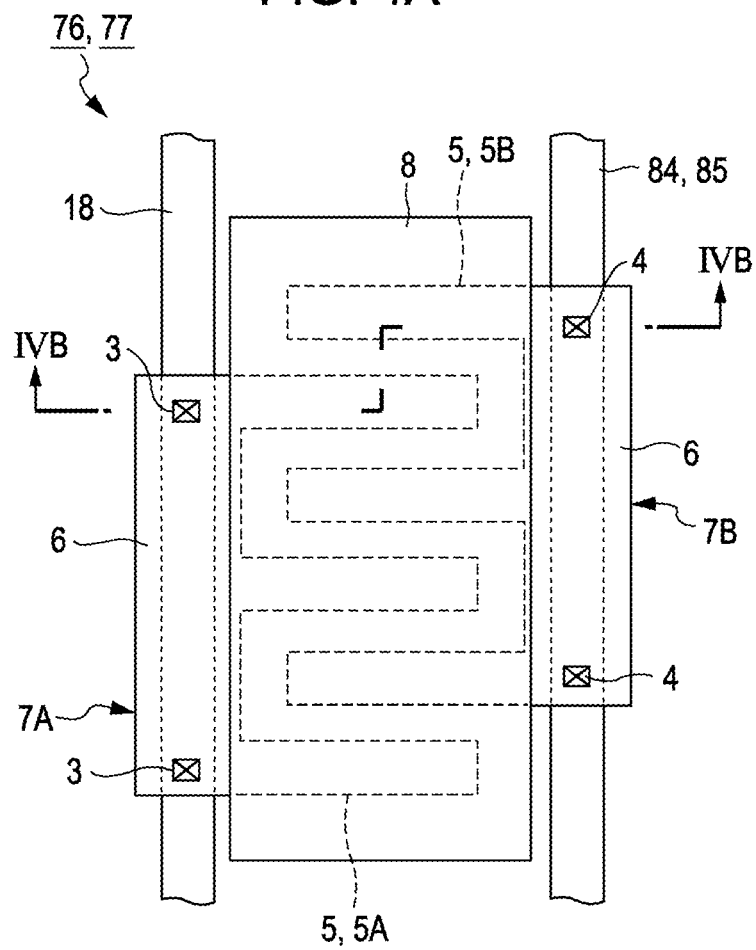
FIGS. 4A and 4B respectively are a plan view and a cross-sectional view of a protection circuit related to an embodiment.
Figure 4B:
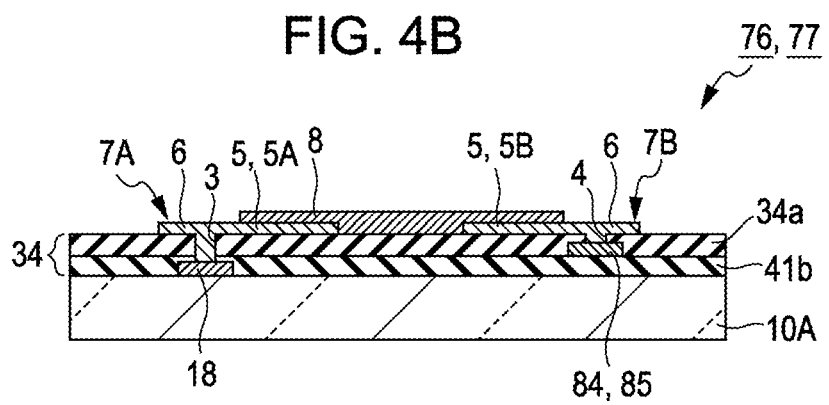

Next, the protection circuits 71 to 78 will be described referring to FIGS. 2A, 2B, 4A, and 4B. FIGS. 4A and 4B are diagrams showing the configuration of the protection circuit, wherein FIG. 4A is a plan view and FIG. 4B is a cross-sectional view taken along line IVB-IVB of FIG. 4A. Although in FIGS. 4A and 4B, the protection circuit 76 (77) is shown as one example, the other protection circuits also have the same configuration.

As shown in FIGS. 2A, 2B, 4A, and 4B, the protection circuits 71 to 78 of this embodiment are each constituted by a pair of electrodes 7A and 7B and an ionic material 8 which comes into contact with each of the electrodes 7A and 7B. These protection circuits 71 to 78 are made such that in a case where an electric current equal to or more than a given electric current is applied between the pair of electrodes 7A and 7B, these electrodes 7A and 7B are short-circuited to each other through the ionic material 8, and therefore, perform a function of preventing application of excessive current to the pixel circuit, thereby preventing damage to the pixel circuit, when excessive current is applied in a manufacturing process or at the time of the driving of a device.

The first electrode 7A and the second electrode 7B are each composed of a material containing the same component as that of the pixel electrode 9, and in this embodiment, the electrodes are formed using the same material (ITO: transparent conductive film, indium tin oxide) as that of the pixel electrode 9 in the same manufacturing process when forming the pixel electrode 9. The first electrode 7A and the second electrode 7B are each made into a comb-teeth shape and are each constituted to have a plurality (in this embodiment, three) of electrode fingers 5 and a connection portion 6 which connects ends on one side of the plurality of these electrode fingers 5, as shown in FIGS. 4A and 4B.

All the three electrode fingers 5 extend in the same direction, thereby being arranged in stripes. In this embodiment, the lengths of the respective electrode fingers 5 are equal to each other. Also, the electrode fingers 5 of the electrodes 7A and 7B are alternately disposed in an array direction thereof. The line width, the interval (pitch), and the like of a plurality of the electrode fingers 5 can be appropriately set.

The connection portion 6 is provided so as to connect one end side of each of the three electrode fingers 5.

The first electrode 7A and the second electrode 7B are in a state where each other's electrode fingers 5 and 5 are engaged with each other, and when a dimension of the engaged portion (a length in which the electrode fingers 5 alternate with each other in an array direction) is set as an alternating width, the alternating width is set to be a length in which an electric field is efficiently generated between the electrode fingers 5A and 5B of the electrodes 7A and 7B.

The ionic material 8 partially comes into contact with each of the first electrode 7A and the second electrode 7B, and in this embodiment, the ionic material is formed into an area with a size which covers all the electrode fingers 5 of each of the electrodes 7A and 7B. The ionic material 8 is provided so as to fill the gaps between the respective electrode fingers 5.

The first electrode 7A and the second electrode 7B in each of the protection circuits 71 to 78 are each connected to wirings of a lower layer through contact holes 3 and 4 formed in the interlayer insulation film 34*a* or the gate insulating film 41*b*. Specifically, as shown in FIGS. 4A and 4B, for example, in the protection circuit 76 (77), the first electrode 7A is connected to the scanning line 18 through the contact holes 3 and the second electrode 7B is connected to the common wiring 84 (85) through the contact holes 4.

The protection circuits 71 to 78 each having the above-described configuration each have nonlinearity in both directions in current-voltage characteristics. That is, in each of the protection circuits 71 to 78, at the time of application of a high voltage or at the time of application of a low voltage, an open state is made, thereby making surge voltage caused by static electricity or the like flow to the common wirings 82 to 85 or the shield wiring 90. As a result, the protection circuits function as electrostatic protection circuits which protect the TFTs 60 of the pixel formation region 110 from static electricity.

The protection circuits 71 to 78 of this embodiment are each constituted such that when a given difference in potential is generated between the first electrode 7A and the second electrode 7B, an electric current flows between the first electrode 7A and the second electrode 7B. For example, if a positive bias exceeding a higher side potential (Vdd) is generated in the scanning line 18 due to generation of static electricity, an electric current flows between the first electrode 7A and the second electrode 7B through the ionic material 8 due to a difference in potential which occurred between the first electrode 7A and the second electrode 7B, so that it is possible to discharge the static electricity to the common wirings 82 to 85 and the shield wiring 90.

In this manner, excessive current flows to the protection circuits 71 to 78, thereby making a short-circuit state, so that generation of defects such as burnout of the pixel circuit (the TFTs 60) due to excessive current can be prevented, whereby it becomes possible to protect the pixel circuit (the TFTs 60).

Therefore, according to this embodiment, a protection circuit is provided which can excellently protect an internal circuit from surge voltage caused by static electricity or the like, and the protection circuit does not generate defects in a circuit configuration even in a case where it is destroyed by excessive voltage, and has excellent reliability.

Also, in the protection circuits 71 to 78 of this embodiment, the ionic material 8 comes into contact with the first electrode 7A and the second electrode 7B. Accordingly, by intentionally making an electric current flow between the electrodes 7A and 7B in a manufacturing process, electric cell action occurs, so that electrical corrosion is generated in either the first electrode 7A or the second electrode 7B. Then, an electrode on the negative pole side is melted and thinned (shortened), so that the gap between the first electrode 7A (the electrode finger 5A) and the second electrode 7B (the electrode finger 5B) is widened, whereby it becomes hard for an electric field to be applied between these electrodes 7A and 7B (the electrode fingers 5A and 5B). As a result, after the protection circuits 71 to 78 are destroyed, insulation properties are highly increased. Therefore, at the time of normal driving, insulation properties are secured, whereby consumption of electric current can be reduced.

In addition, as the materials of the electrodes 7A and 7B, different electrically conductive materials may be used provided that they are materials containing the same component as that of the pixel electrode 9. In the above-described embodiment, both the first electrode 7A and the second electrode 7B in the protection circuits 71 to 78 are composed of ITO which is the same as the pixel electrode 9. However, a configuration is also acceptable in which electric cell action can be reliably obtained by making electrochemical potentials of the electrodes 7A and 7B be different from each other by forming the electrodes by using different materials, and not the same material. As a result, open destruction of the protection circuits 71 to 78 is facilitated. Also, an electrical conducting material containing metal oxide as its main component can also be suitably used.

Electro-Optical Device

Next, a plurality of configurations of an electro-optical device according to the invention will be described referring to FIGS. 5A to 5D.

Electrophoretic Display Device

Figure 5A:
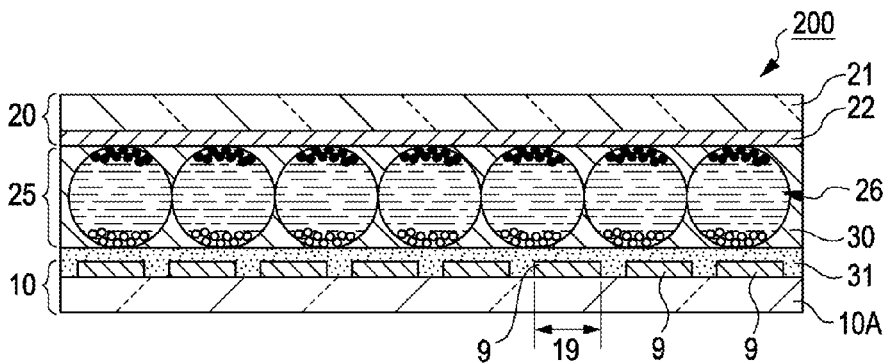
FIGS. 5A to 5D are cross-sectional views showing a liquid crystal device which is one example of an electro-optical device.

FIG. 5A is a cross-sectional view showing an electrophoretic display device which is one example of the electro-optical device according to the invention.

An electrophoretic display device 200 has a configuration in which an electrophoretic element 25 (an electro-optical material layer) is sandwiched in between the active matrix substrate 10 of the above-described embodiment and an opposing substrate 20.

The opposing substrate 20 includes a transparent substrate 21 composed of glass or plastic, and a common electrode 22 composed of a transparent conductive film such as ITO and formed on the transparent substrate 21. The electrophoretic element 25 has a plurality of microcapsules 80 arranged in a plane on the common electrode 22, and a binder 30 which fixes the microcapsules 80 onto the common electrode 22. The microcapsule 80 has a configuration in which, for example, white particles, black particles, and a dispersion medium are enclosed in the inside of a spherical wall film. Then, the electrophoretic element 25 and the active matrix substrate 10 are bonded to each other through an adhesive layer 31.

In addition, the electrophoretic element 25 is generally handled as an electrophoretic sheet which is formed on the opposing substrate 20 side in advance and which includes up to the adhesive layer 31. In a manufacturing process, the electrophoretic sheet is handled in a state where a protective release sheet is stuck to the surface of the adhesive layer 31. Then, a display section is formed by sticking the electrophoretic sheet with the release sheet peeled off to the active matrix substrate 10 manufactured separately. Therefore, the adhesive layer 31 exists only on the pixel electrode 9 side.

In the electrophoretic display device 200 having the above-described configuration, since the active matrix substrate 10 of the previous embodiment is used for an element substrate thereof, application of excessive current to the pixel circuit is prevented by the protection circuits 71 to 78, so that damage of the pixel circuit can be prevented. In the protection circuits 71 to 78 of this embodiment, as the ionic material 8 (refer to FIGS. 4A and 4B) which comes into contact with the first electrode 7A and the second electrode 7B, a material is used which contains the same component as that of the binder 30 which fixes the microcapsules 80 of the electrophoretic element 25 onto the common electrode 22 or that of the adhesive layer 31 which bonds the electrophoretic element 25 onto the active matrix substrate 10. Since the binder 30 or the adhesive layer 31 contains moisture or ions, thereby having electrically conductive properties, it can be suitably used as the ionic material 8 which conductively connects the first electrode 7A and the second electrode 7B. As a result, a material which has been used in traditional manufacturing processes can be used, whereby an increase in cost relating to materials can be prevented.

Alternatively, a configuration is also acceptable in which the electrophoretic element 25 is disposed on the protection circuits 71 to 78. In this case, the adhesive layer 31 of the electrophoretic sheet is brought into contact with the first electrode and the second electrode, which constitute the protection circuit, by bonding the electrophoretic sheet onto the active matrix substrate 10, and a portion of the adhesive layer 31 functions as the ionic material which conductively connects the first electrode and the second electrode. As another effect of this case, traces generated by electrical discharge in the protection circuit can be easily observed as "black and white display" of the electrophoretic element 25 on the protection circuit. For example, in a case where electrical discharge from the first electrode to the second electrode of the protection circuit has occurred, it is preferable if it is observed through display in which the first electrode side is expressed by "black display" and the second electrode side is expressed by "white display". As a result, specification of a static electricity generation process or feedback regarding a static electricity countermeasure design is facilitated in the early stage of design and trial production, whereby the high-definition electrophoretic display device 200 can be obtained.

In the electrophoretic display device 200, a place where electrical discharge occurred due to static electricity is found according to whether a display state of each pixel 19 is a black display or a white display. If the pixel circuit is destroyed by application of excessive current, a difference in potential between the pixel electrode 9 and the common electrode 22 disappears, resulting in a white display. As a result, a weak portion can be specified, so that specification of a faulty place becomes possible. Therefore, defect analysis is facilitated, whereby the high-definition electrophoretic display device 200 can be obtained.

Organic EL (Electroluminescence) Device

Figure 5B:
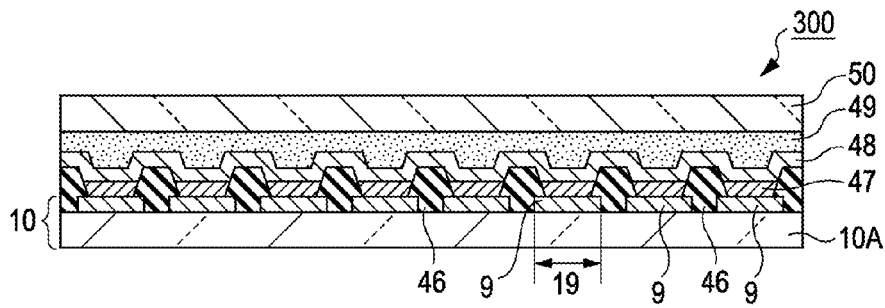

FIG. 5B is a cross-sectional view showing an organic EL device which is one example of the electro-optical device according to the invention.

An organic EL device 300 includes, on the active matrix substrate 10 of the above-described embodiment, partition walls 46 which partition regions for each pixel electrode 9, an organic functional layer 47 (an electro-optical material layer) formed at a region on the pixel electrode 9 surrounded by the partition walls 46, a common electrode 48 formed to cover the organic functional layer 47 and the partition walls 46, an adhesive layer 49, and a sealing substrate 50.

The partition wall 46 is composed of an inorganic insulation film, an organic insulation film, or a laminated insulation film of these films and performs a function of partitioning the organic functional layers 47 which are formed on the pixel electrode 9. As the organic insulation film, for example, light-curing acrylic resin, polyimide resin, or the like can be used, and as the inorganic insulation film, silicon oxide, silicon nitride, or the like can be used.

The organic functional layer 47 includes at least an organic light emitting layer and typically has a configuration in which a hole injecting layer and the organic light emitting layer are laminated in order from the pixel electrode 9 side. For the hole injecting layer, for example, an electrically conductive polymer material such as PEDOT/PSS can be used. The organic light emitting layer is constituted so as to be capable of emitting red light, green light, or blue light according to a difference in a forming material thereof, and one pixel of full-color display is constituted by light of three colors of red, green, and blue.

A hole transporting layer may be further formed between the hole injecting layer and the organic light-emitting layer.

The common electrode 48 is formed over a plurality of organic functional layers 47 and has a configuration in which, for example, a cathode layer and a resonance layer are laminated.

The cathode layer is formed by using a material having a low work function (for example, 5 eV or less) and, for example, calcium, magnesium, sodium, strontium, barium, lithium, or any one of metal fluorides such as calcium fluoride, a metal oxide such as lithium oxide, an organo-metallic complex such as acetylacetonato calcium, and the like, which are compounds of the above elements, can be used.

The resonance layer is a layer composed of a metal material and, for example, a co-deposited film of magnesium and silver can be used. A co-deposition ratio of magnesium and silver is, for example, 10:1 in a volume ratio. The resonance layer is a semi-transmissive film which reflects a portion of light emitted from the organic functional layer 47 and transmits a portion of the light.

The adhesive layer 49 is composed of transparent resin such as epoxy resin, for example, and fixes the sealing substrate 50, which is a transparent substrate composed of glass or plastic, to the active matrix substrate 10 and also performs a function of preventing penetration of moisture or the like into the organic functional layer 47. In addition, an inorganic insulation film composed of silicon oxide, silicon nitride, or silicon oxynitride may be formed between the common electrode 48 and the adhesive layer 49.

According to the organic EL device 300 having the above-described configuration, since the active matrix substrate 10 of the previous embodiment is used for an element substrate thereof, an organic EL device having low power consumption and high display quality is obtained.

Also, if the adhesive layer 49 which fixes the sealing substrate 50 to the active matrix substrate 10 is formed by using a material containing ions, a material of the same component as that of the adhesive layer 49 can be suitably used as the ionic materials of the protection circuits 71 to 78. As a result, there is no need to prepare a separate material, so that an increase in cost can be prevented.

Liquid Crystal Device

Figure 5C:
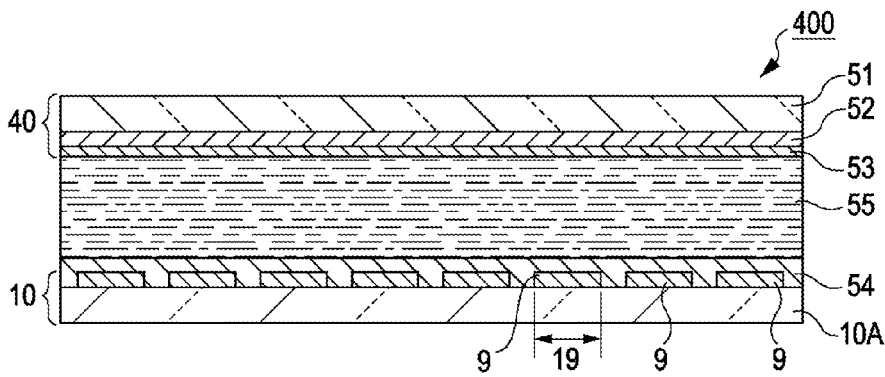

FIG. 5C is a cross-sectional view showing a liquid crystal device which is one example of the electro-optical device according to the invention.

A liquid crystal device 400 has a configuration in which a liquid crystal layer 55 (an electro-optical material layer) is sandwiched in between the active matrix substrate 10 of the above-described embodiment and an opposing substrate 40.

The opposing substrate 40 includes a transparent substrate 51 composed of glass, plastic, or the like, a common electrode 52, and an alignment film 53, wherein the common electrode 52 and the alignment film 53 are formed in order on the liquid crystal layer 55 side of the transparent substrate 51. In addition, an alignment film 54 is also formed on the pixel electrode 9 of the active matrix substrate 10.

The alignment films 53 and 54 are films composed of polyimide or the like and subjected to a rubbing treatment and function to control orientation states of liquid crystal molecules in the liquid crystal layer 55 by the alignment films 53 and 54 which are disposed to face each other.

As the configuration of the liquid crystal device, any of the configurations of known active matrix type liquid crystal devices can be applied. For example, as an orientation mode of a liquid crystal, any of a variety of known modes such as a TN type, a VAN type, a STN type, a ferroelectric type, and an antiferroelectric type can be adopted. Also, color display may be performed by disposing a color filter on either the active matrix substrate 10 or the opposing substrate 40. Further, a reflective liquid crystal device may be constituted by forming a reflective film on the active matrix substrate 10 and a transflective liquid crystal device may be constituted by forming a light transmitting portion such as an opening portion or a slit in the reflective film.

According to the liquid crystal device 400 having the above-described configuration, since the active matrix substrate 10 of the previous embodiment is used for an element substrate thereof, a liquid crystal device having low power consumption and high display quality is obtained.

Imaging Device

Figure 5D:
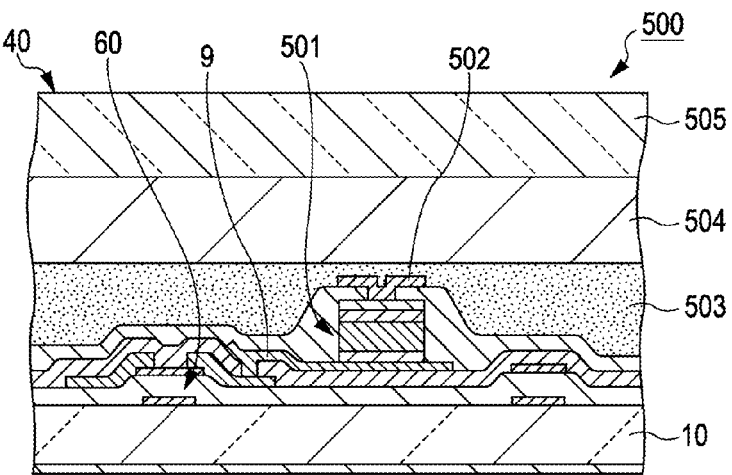

FIG. 5D is a cross-sectional view showing an imaging device which is one example of the electro-optical device according to the invention.

An imaging device 500 is one example of an X-ray imaging device called an FPD (Flat Panel Detector) and is called an indirect conversion type FPD. The imaging device 500 includes at least a photoelectric conversion element 501 and a bias wiring 502, which are provided on the pixel electrode 9 of the active matrix substrate 10 of the above-described embodiment, and is provided with an adhesive layer 503, a scintillator 504 which converts X-rays into visible light, and a sealing substrate 505 composed of glass, plastic, or the like, which are provided above the bias wiring. As necessary, the imaging device may also be provided with an optical element such as a microlens, or a grid.

The material of the scintillator 504 is selected, for example, from GOS (gadolinium oxysulfide), CsI (cesium iodide), and the like according to purposes or manufacturing costs. The adhesive layer 503 is composed of transparent resin such as epoxy resin, for example, and fixes the sealing substrate 505, which is a transparent substrate composed of glass or plastic, to the active matrix substrate 10 and also performs a function of preventing penetration of moisture or the like into the photoelectric conversion element 501. In addition, an inorganic insulation film composed of silicon oxide, silicon nitride, or silicon oxynitride may be formed between the bias wiring 502 and the adhesive layer 503.

According to the imaging device 500 having the above-described configuration, since the active matrix substrate 10 of the previous embodiment is used for an element substrate thereof, an imaging device is obtained in which power consumption is low, thermal noise is small, S/N ratio is high, and therefore, imaging quality is high.

Also, if the adhesive layer 503 which fixes the sealing substrate 505 to the active matrix substrate 10 is formed by using a material containing ions, a material of the same component as that of the adhesive layer 503 can be suitably used as the ionic materials of the protection circuits 71 to 78. As a result, there is no need to prepare a separate material, so that an increase in cost can be prevented.

Manufacturing Method of Electrophoretic Display Device

Next, a manufacturing method of the electrophoretic display device will be described.

Figure 6:
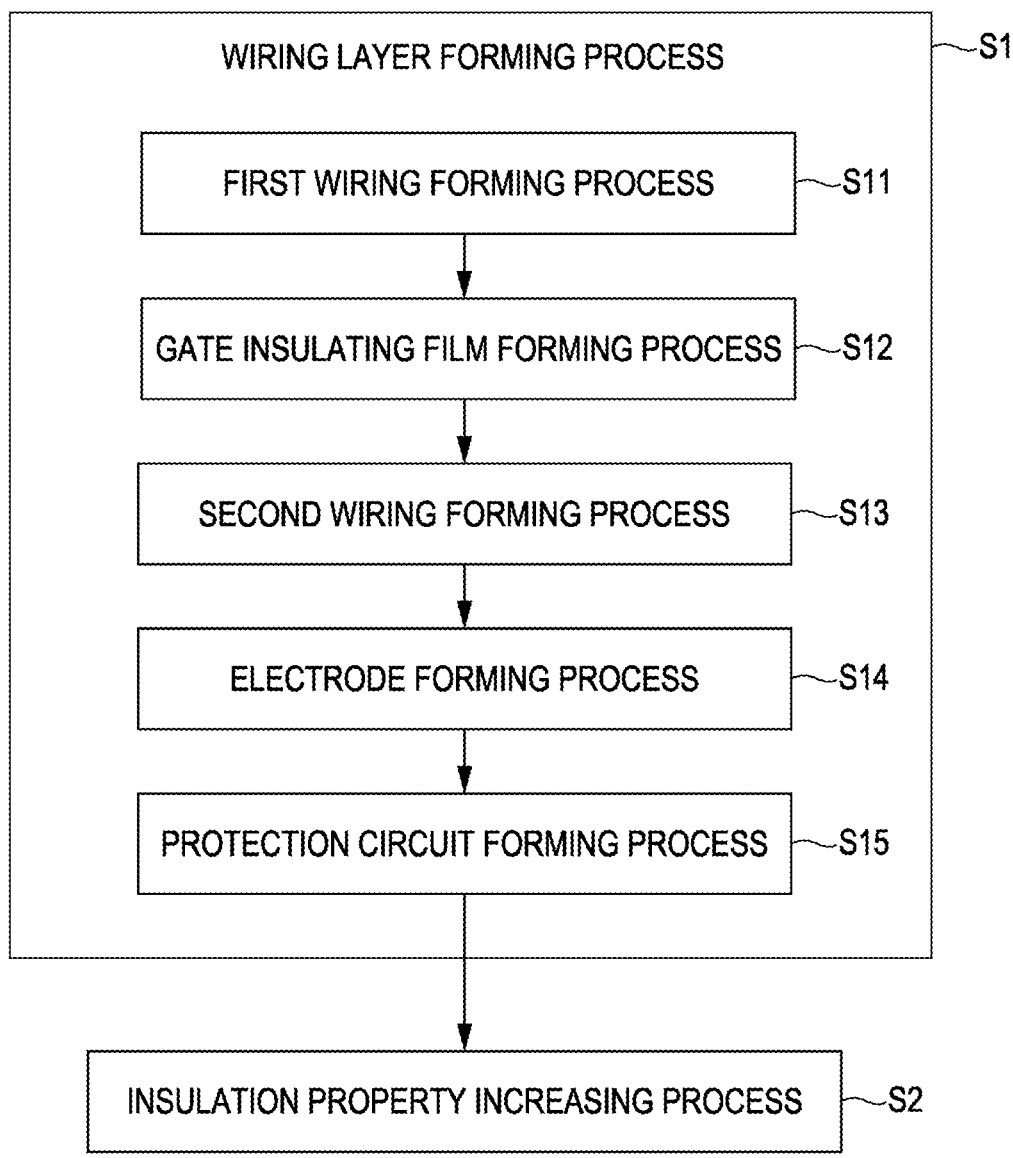
FIG. 6 is a flowchart showing a manufacturing method of an electrophoretic display device.

FIG. 6 is a flowchart in the manufacturing method of the electrophoretic display device according to the invention.

FIGS. 7A to 11B are process drawings in the manufacturing method of the electrophoretic display device according to the invention and show one electrophoretic display device on an enlarged scale. In fact, a wafer substrate having a plurality of device forming region portions is used and treatment such as film-formation or etching is performed on a plurality of device forming region portions at the same time. Then, after each constituent element of the electrophoretic display device is formed, the electrophoretic display devices are made from a plurality of device forming region portions by dividing a wafer into individual pieces for every device forming region portion, whereby a plurality of electrophoretic display devices is fabricated at the same time. In addition, in FIGS. 7A to 11B, FIGS. 7A, 8A, 9A, 10A, and 11A each show a cross-sectional view of the protection circuit side and FIGS. 7B, 8B, 9B, 10B, and 11B each show a cross-sectional view of the TFT side.

The manufacturing method of the electrophoretic display device 200 of this embodiment includes a wiring layer forming process S1 which forms a pixel circuit, wirings connected to the pixel circuit, and protection circuits connected to the wirings, on the substrate main body 10A, and an insulation property increasing process S2 which increases insulation properties of the protection circuits. Also, the wiring layer forming process S1 includes a first wiring forming process S11, a gate insulating film forming process S12, a second wiring forming process S13, an electrode forming process S14, and a protection circuit forming process S15.

Figure 7A:
FIGS. 7A and 7B are cross-sectional views showing a manufacturing process of the electrophoretic display device.
Figure 7B:
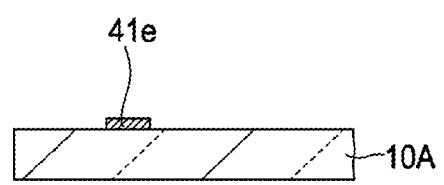

First, as shown in FIGS. 7A and 7B, the scanning line 18, the gate electrode 41e, and the common wirings 82 and 83 are formed on the substrate main body 10A composed of a glass substrate, a quartz substrate, or the like (S11). Specifically, after a metal film of Al, Ti, Cr, or the like or a laminated film of these metals is formed by using a film-formation method such as a sputtering method or a CVD method, the gate electrode 41e, the scanning line 18, and the common wirings 82 and 83 are obtained by performing patterning by a photolithography process and an etching process. Alternatively, the above wirings may be formed by applying ink containing metal particles or carbon into a predetermined pattern by a printing method such as a liquid droplet discharging method and then drying and solidifying it.

Figure 8A:
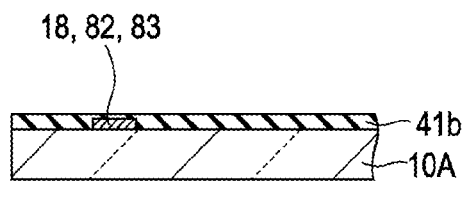
FIGS. 8A and 8B are cross-sectional views showing a manufacturing process of the electrophoretic display device.
Figure 8B:
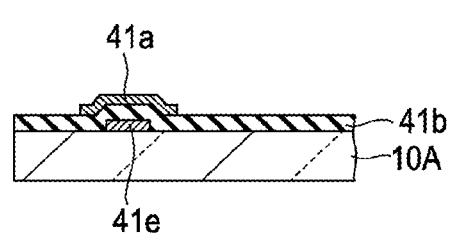

Next, as shown in FIGS. 8A and 8B, the gate insulating film 41b is formed on the substrate main body 10A so as to cover the gate electrode 41e, the scanning line 18, and the common wirings 82 and 83 (S12). In the case of this embodiment, since the gate insulating film 41b is formed over the entire surface of the substrate main body 10A, it is preferable to form the gate insulating film 41b by using a spin coating method or a vapor deposition method in terms of film-formation efficiency.

Thereafter, the semiconductor layer 41a is formed at a position facing the gate electrode 41e on the surface of the gate insulating film 41b (FIG. 8B). As a film-formation method of the semiconductor layer 41a, a vacuum deposition method, a molecular beam epitaxial growth method, a CVD method, a sputtering method, a plasma polymerization method, an electrolytic polymerization method, a chemical polymerization method, an ion plating method, a spin coating method, a casting method, a pulling method, a Langmuir-Blodgett's technique, a spray method, an ink jet method, a roll coating method, a bar coating method, a dispensing method, a silk screen method, a dip coating method, or the like is given. However, it is not to be limited thereto. Among these methods, a method of applying and forming the semiconductor layer from a liquid material by using the ink jet method or the dispensing method is preferable from the point of view that it is possible to most easily control film thickness. In addition, after a liquid material containing a semiconductor material is applied onto the substrate main body 10A, a solid semiconductor layer 41a is obtained by performing a heating treatment. In this way, the semiconductor layer 41a is formed corresponding to each pixel.

Figure 9A:
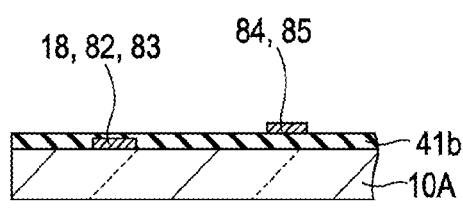
FIGS. 9A and 9B are cross-sectional views showing a manufacturing process of the electrophoretic display device.
Figure 9B:
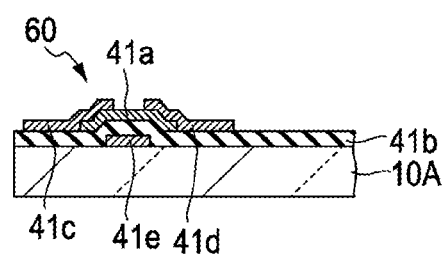

Subsequently, as shown in FIGS. 9A and 9B, the source electrode 41c and the drain electrode 41d are formed for each semiconductor layer 41a and also the common wirings 84 and 85 are simultaneously patterned and formed, and As a result, the TFT 60 is formed at each pixel (S13).

Figure 10A:
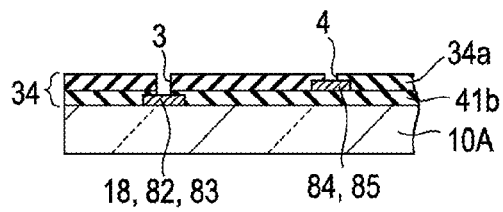
FIGS. 10A and 10B are cross-sectional views showing a manufacturing process of the electrophoretic display device.
Figure 10B:
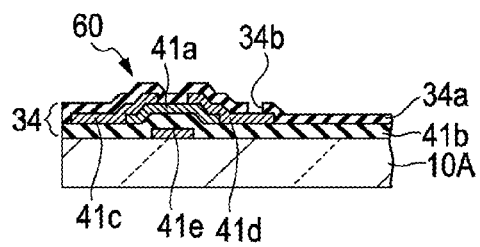

Then, as shown in FIGS. 10A and 10B, the interlayer insulation film 34a is formed on the gate insulating film 41b on which the TFT 60 and the common wirings 84 and 85 are formed. In this embodiment, the interlayer insulation film 34a is formed on the substrate main body 10A by using the spin coating method or the vapor deposition method.

Next, the contact holes 34b and 4 which pass through the interlayer insulation film 34a are formed at predetermined positions of the substrate main body 10A, thereby exposing a portion of the drain electrode 41d through the contact hole 34b and also exposing a portion of the common wiring 84 (85) through the contact hole 4. Also, the contact hole 3 which passes through the interlayer insulation film 34a and the gate insulating film 41b is formed, thereby exposing a portion of the scanning line 18.

Figure 11A:
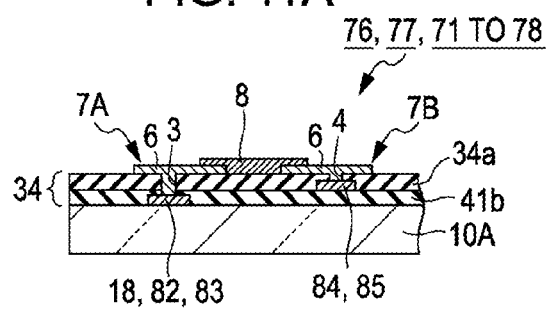
FIGS. 11A and 11B are cross-sectional views showing a manufacturing process of the electrophoretic display device.
Figure 11B:
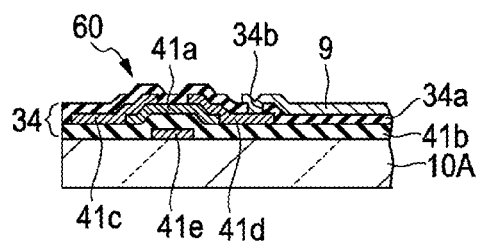

Next, as shown in FIGS. 11A and 11B, the first and second electrodes 7A and 7B of a comb-teeth shape are respectively formed at predetermined positions on the interlayer insulation film 34a, where the contact holes 3 and 4 are formed, and the pixel electrode 9 of a rectangular shape is formed at a predetermined position on the interlayer insulation film 34a, where the contact hole 34b is formed (S14). In this embodiment, the first electrode 7A, the second electrode 7B, and the pixel electrode 9 are formed of ITO and are formed in the same process. In addition, the first electrode 7A and the second electrode 7B may also be formed using different electrically conductive materials. An electrically conductive material containing metal oxide as its main component can be suitably used as the electrodes 7A and 7B.

Also, in this process, the pixel electrode 9 and the drain electrode 41d are electrically connected to each other, whereby a pixel circuit is formed. At the same time, any one of a pair of first and second electrodes 7A and 7B and the scanning line 18 are electrically connected to each other and any one of a pair of first and second electrodes 7A and 7B and the common wiring 84 (85) are electrically connected to each other.

In addition, the pixel electrode 9, the first electrode 7A, and the second electrode 7B may be formed by the same process as the forming process of the gate electrode 41e described previously.

Next, as shown in FIG. 11A, the ionic material 8 is formed so as to span the first electrode 7A and the second electrode 7B which are adjacent to each other. As for a forming method of the ionic material 8, the ionic material 8 which comes into contact with the first electrode 7A and the second electrode 7B can be formed by applying and drying the same material as that of the adhesive layer 31 of the electrophoretic sheet. In this way, a plurality of protection circuits 71 to 78 is formed around the pixel formation region (S15).

Next, a direct-current electric current is supplied between the first electrode 7A and the second electrode 7B in the protection circuits 71 to 78, so that either electrode of the first electrode 7A or the second electrode 7B is corroded, thereby increasing insulation properties of the protection circuits 71 to 78. In this way, the active matrix substrate 10 of this embodiment is obtained.

Next, the opposing substrate 20 having the common electrode 22 is disposed above the active matrix substrate 10 so as to face the active matrix substrate and the electrophoretic element 25 is then put in therebetween, whereby the electrophoretic display device 200 of this embodiment is obtained (refer to FIG. 5A).

In addition, in the manufacturing method of this embodiment, the ionic material 8 is formed before attachment of the electrophoretic sheet. However, it is also acceptable that the electrophoretic sheet is formed in advance into a size larger than the pixel formation region and the protection circuits 71 to 78 are then formed by attaching the large-sized electrophoretic sheet onto the first and second electrodes 7A and 7B formed around the pixel formation region, so as to cover the electrodes. In this case, the adhesive layer 31 of the electrophoretic sheet comes into contact with the first electrode 7A and the second electrode 7B, so that a portion of the adhesive layer 31 functions as the protection circuits 71 to 78.

If an electric current flows between the first electrode 7A and the second electrode 7B, a difference in potential occurs between the first electrode 7A and the second electrode 7B and a leakage current path caused by the difference in potential is formed, so that an electric field is generated between the electrodes 7A and 7B (the electrode fingers 5A and 5B). Electric field corrosion is induced in any one (the positive pole side) of the first electrode 7A and the second electrode 7B by the electric field. The electric field corrosion (metal corrosion) induced in this way locally occurs in at least a portion (the electrode finger 5) with which the ionic material 8 comes into contact. That is, by forcibly supplying a direct-current electric current from the outside to between the first electrode 7A and the second electrode 7B in the protection circuits 71 to 78, an electric cell reaction occurs, whereby it is possible to partially dissolve either one of the electrodes. As a result, the gap between the electrode fingers 5A and 5B is widened, so that it becomes hard for an electric field to be applied between these electrode fingers 5A and 5B. In this way, the protection circuits 71 to 78 are destroyed, so that insulation properties are highly increased.

In this embodiment, since each of the electrodes 7A and 7B is made into a comb-teeth shape, the respective electrode fingers 5A and 5B of the respective electrodes 7A and 7B alternate in one direction. Therefore, an electric field occurs between the electrode fingers 5A and 5B of the respective electrodes 7A and 7B by application of voltage, and the electric field acts from both sides of each of the electrode fingers 5A and 5B except for the electrode finger 5 disposed on the outside, so that electrical corrosion easily occurs. In this manner, by making each of the electrodes 7A and 7B into a comb-teeth shape, it is possible to reliably make the protection circuits 71 to 78 be in an open state in a short time. As a result, it is possible to excellently discharge surge voltage, whereby the pixel circuit can be protected.

Also, even after the protection circuits 71 to 78 are destroyed, since the insulation properties of the electrode 7A (7B) connected to the common wirings 82 to 85 and the shield wiring 90 are secured, an electric current is prevented from leaking from the protection circuits 71 to 78 at the time of normal driving, so that consumption of electric current can be reduced.

As a result, an electrostatic protection circuit, which excellently provides a bypass for surge voltage caused by static electricity or the like, can be formed and also the electrophoretic display device 200 can be provided which can operate even after surge voltage sufficient to destroy the protection circuits is input.

Hereinbefore, the preferred embodiments related to the invention have been described referring to the accompanying drawings. However, it is needless to say that the invention is not limited to the related examples. It will be apparent to those skilled in the art that various changes or modifications can be contemplated within the scope of the technical idea as set forth in the claims, and it will be understood by those skilled in the art that these changes and modifications also naturally belong to the technical scope of the invention.

If surge voltage is applied many times to the protection circuits 71 to 78, there is a fear that electrode corrosion will progress and the protection circuit function will be lost. Therefore, in order to control the amount of electric current flowing through the protection circuits 71 to 78, a configuration provided with a resistor may be made. The resistor may be a nonlinear element such as a MOS diode using a TFT, a PIN diode, or a MIM diode.

Figure 12:
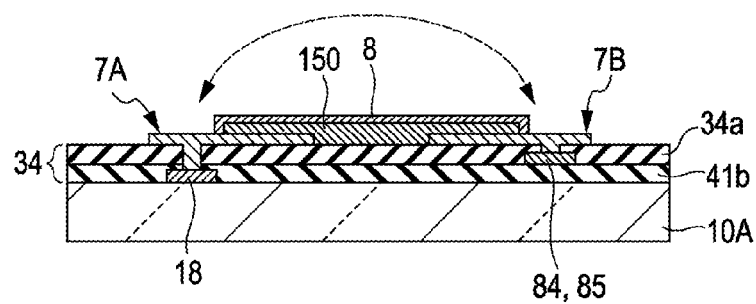
FIG. 12 is a modified example of the active matrix substrate.

For example, as shown in FIG. 12, a configuration is also acceptable in which a bank 150 having a predetermined height is formed between the electrodes 7A and 7B of each of the protection circuits 71 to 78, thereby performing resistance adjustment of each of the protection circuits 71 to 78. The bank 150 is formed so as to be placed on the peripheral edges of the opposed end portions of the electrodes 7A and 7B and the entire surface thereof is covered by the ionic material 8. At this time, the ionic material 8 comes into contact with the respective electrodes 7A and 7B.

In this manner, by disposing the bank 150 between the electrodes 7A and 7B of each of the protection circuits 71 to 78 and then disposing the ionic material 8 so as to straddle the bank, it is possible to adjust a resistance value (control the amount of electric current) of each of the protection circuits 71 to 78. Also, it is possible to adjust the magnitude of the resistance value by adjusting the height of the bank 150.

As a result, a function of the protection circuits 71 to 78 can be secured for the long term without affecting the internal circuit.

Electronic Apparatuses

Next, cases where the electro-optical devices (the electrophoretic display device 200, the organic EL device 300, and the liquid crystal device 400) of the above-described embodiments are applied to electronic apparatuses will be described.

Figure 13:
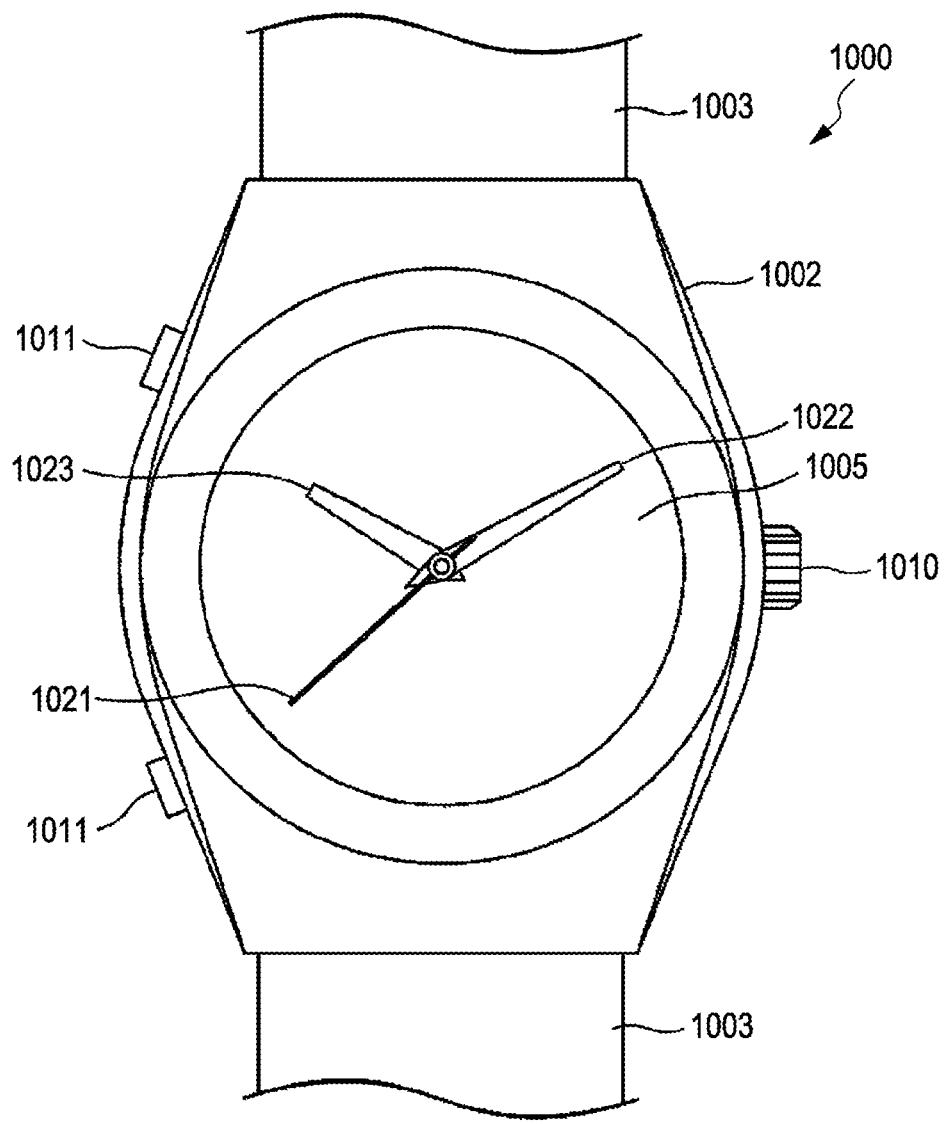
FIG. 13 is a view showing one example of an electronic apparatus.

FIG. 13 is a front view of a wrist watch 1000. The wrist watch 1000 is provided with a watch case 1002 and a pair of bands 1003 connected to the watch case 1002.

At the front of the watch case 1002, a display section 1005 which is composed of the electro-optical device of each embodiment described above, a second hand 1021, a minute hand 1022, and an hour hand 1023 are provided. At the side of the watch case 1002, a winding crown 1010 and an operation button 1011, which serve as operators, are provided. The winding crown 1010 is connected to a winding stem (not shown) which is provided in the inside of the case, and provided so as to be capable of being pushed and pulled in multiple stages (for example, two stages) and be rotatable together with the winding stem. At the display section 1005, an image which serves as a background, a character string such as a date or a time, the second hand, the minute hand, the hour hand, or the like can be displayed.

Figure 14:
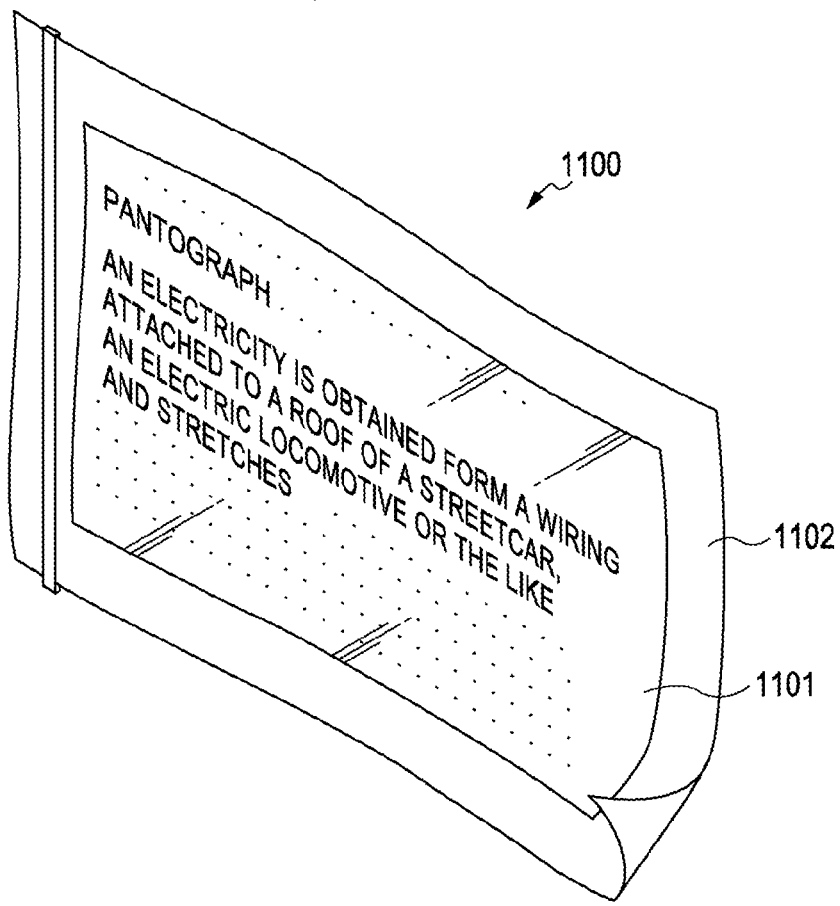
FIG. 14 is a view showing one example of an electronic apparatus.

FIG. 14 is a perspective view showing the configuration of an electronic paper 1100. The electronic paper 1100 has the electro-optical device of the above-described embodiment at a display region 1101. The electronic paper 1100 has flexibility and is constituted to have a main body 1102 composed of a rewritable sheet having texture and pliability similar to traditional paper.

Figure 15:
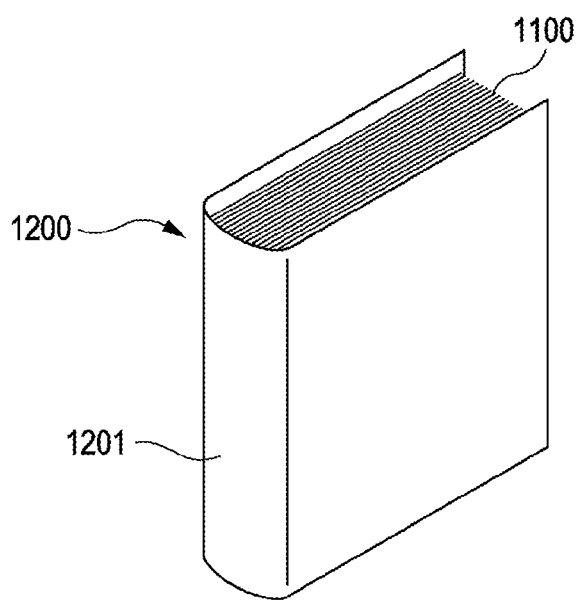
FIG. 15 is a view showing one example of an electronic apparatus.

FIG. 15 is a perspective view showing the configuration of an electronic notebook 1200. The electronic notebook 1200 has a configuration in which plural sheets of electronic papers 1100 described above are bundled and sandwiched in between covers 1201. The cover 1201 is provided with a display data input section (not shown) for inputting display data which is sent from an external device, for example. As a result, it is possible to perform changing or updating of display contents according to the display data in a state where the electronic papers remain bundled.

According to the wrist watch 1000, the electronic paper 1100, and the electronic notebook 1200, since the electro-optical device according to the invention is adopted, the electronic apparatuses provided with a display section having excellent operation reliability and high display quality are obtained.

In addition, the above-described electronic apparatuses are to exemplify the electronic apparatuses according to the invention and not to limit the technical scope of the invention. The electro-optical device according to the invention can also be suitably used in display sections of electronic apparatuses such as a mobile telephone and a portable audio apparatus, for example.

The entire disclosure of Japanese Patent Application No. 2009-280634, filed Dec. 10, 2009 is expressly incorporated by reference herein.

What is claimed is:

1. A substrate for an electro-optical device provided with a protection circuit, comprising:
   a substrate;
   a pixel circuit arranged and formed on the substrate;
   a wiring connected to the pixel circuit; and
   a protection circuit connected to the wiring, the protection circuit comprising:
      a first electrode;
      a second electrode; and
      an ionic material which comes into contact with the first electrode and the second electrode,
      wherein when a given difference in a potential is generated between the first electrode and the second electrode, an electric current flows between the first electrode and the second electrode through the ionic material.

2. An electro-optical device provided with a protection circuit, comprising:
   a substrate;
   an electro-optical material layer formed on the substrate;
   a pixel circuit arranged and formed on the substrate;
   a wiring connected to the pixel circuit; and
   a protection circuit connected to the wiring, the protection circuit comprising:
      a first electrode;
      a second electrode; and
      an ionic material which comes into contact with the first electrode and the second electrode,
      wherein at least one of the first electrode and the second electrode is connected to the wiring, and
      when a given difference in a potential is generated between the first electrode and the second electrode, an electric current flows between the first electrode and the second electrode through the ionic material.

3. The electro-optical device according to claim 2, wherein the first electrode or the second electrode contains the same component as that of a pixel electrode which is included in the pixel circuit.

4. An electronic apparatus provided with the electro-optical device according to claim 2.

5. An electrophoretic display device having an electrophoretic element sandwiched in between a pair of substrates, the device comprising: on one side of the substrate,
   a plurality of pixel circuits,
   a wiring connected to the respective pixel circuits, and
   a protection circuit connected to the wiring,
   wherein the protection circuit includes a first electrode, a second electrode, and an ionic material which comes into contact with the first electrode and the second electrode, and when a given difference in potential is generated between the first electrode and the second electrode, an electric current flows between the first electrode and the second electrode through the ionic material.

6. The electrophoretic display device according to claim 5, wherein
   the electrophoretic element includes a plurality of microcapsules containing electrophoretic particles, and a binder fixing the microcapsules, and
   the ionic material of the protection circuit contains the same component as that of the binder.

7. The electrophoretic display device according to claim 5, wherein
   the electrophoretic element and the substrate are bonded to each other through an adhesive layer, and
   the ionic material of the protection circuit contains the same component as that of the adhesive layer.

8. The electrophoretic display device according to claim 5, wherein the electrophoretic element is disposed on the protection circuit.

9. The electrophoretic display device according to claim 5, wherein the first electrode or the second electrode contains the same component as that of a pixel electrode which is included in the pixel circuit.

* * * * *